United States Patent [19]

Paice

[11] 4,221,319
[45] Sep. 9, 1980

[54] APPARATUS FOR WELDING METAL GRATING STRUCTURES

[75] Inventor: Raymond P. Paice, Hillside, Ill.

[73] Assignee: Paco Corporation, Bridgeview, Ill.

[21] Appl. No.: 932,193

[22] Filed: Aug. 9, 1978

[51] Int. Cl.³ .......................... B23K 9/00; B23K 9/32; B23K 37/02; B23K 37/04
[52] U.S. Cl. ................. 228/25; 228/44.1 R; 219/125.1; 219/161; 219/56
[58] Field of Search .............. 228/25, 44.1 R, 212, 228/213; 219/125.1, 124.1, 124.22, 161, 56; 269/8, 41, 111, 155, 303, 13, 14

[56] References Cited

U.S. PATENT DOCUMENTS

| | | | |
|---|---|---|---|
| 1,089,561 | 3/1914 | Howard | 269/14 |
| 2,743,692 | 5/1956 | Wietzel et al. | 219/125.1 |
| 3,271,557 | 9/1966 | Wight et al. | 219/125.1 |
| 3,401,254 | 9/1968 | McConnell | 219/124.22 |
| 3,458,182 | 7/1969 | Flachbarth et al. | 269/41 |
| 3,561,663 | 2/1971 | Wenzlaff | 228/25 |
| 3,650,457 | 3/1972 | Fiegel, Jr. et al. | 228/44.1 |
| 3,815,890 | 6/1974 | Urban | 29/160 |
| 3,892,939 | 7/1975 | Medley | 228/44.1 |
| 3,946,933 | 3/1976 | Bergling | 228/25 |
| 4,121,084 | 10/1978 | Wear | 219/125.1 |

FOREIGN PATENT DOCUMENTS 49-10580  3/1974  Japan ........................ 228/25

Primary Examiner—Daniel C. Crane
Attorney, Agent, or Firm—Gary, Juettner & Pyle

[57] ABSTRACT

An apparatus for welding a metal grating structure is characterized by a fixture for holding a metal grating in aligned relationship with a nosing and side plates therefor, and a plurality of welding guns for automatically welding the grating, side plates and nosing together into a unitary structure. The fixture includes mounting members for receiving and holding each of the metal grating, nosing and side plates, and for then bringing the same together into aligned relationship. The welding guns are normally positioned remote from the fixture to facilitate placement of the components thereon, and are automatically movable theretoward to effect a predetermined number of welds at selected positions between the components.

14 Claims, 5 Drawing Figures

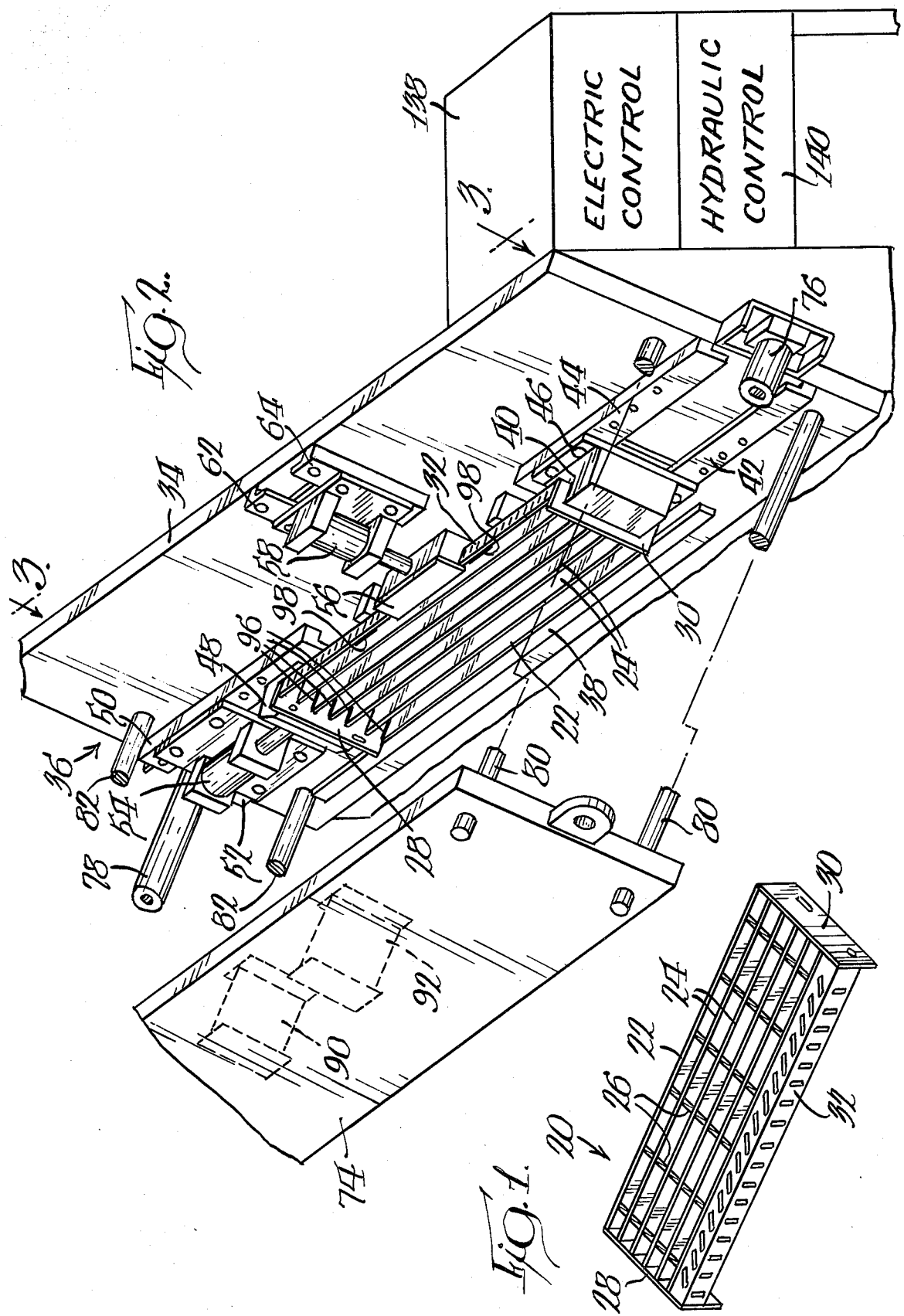

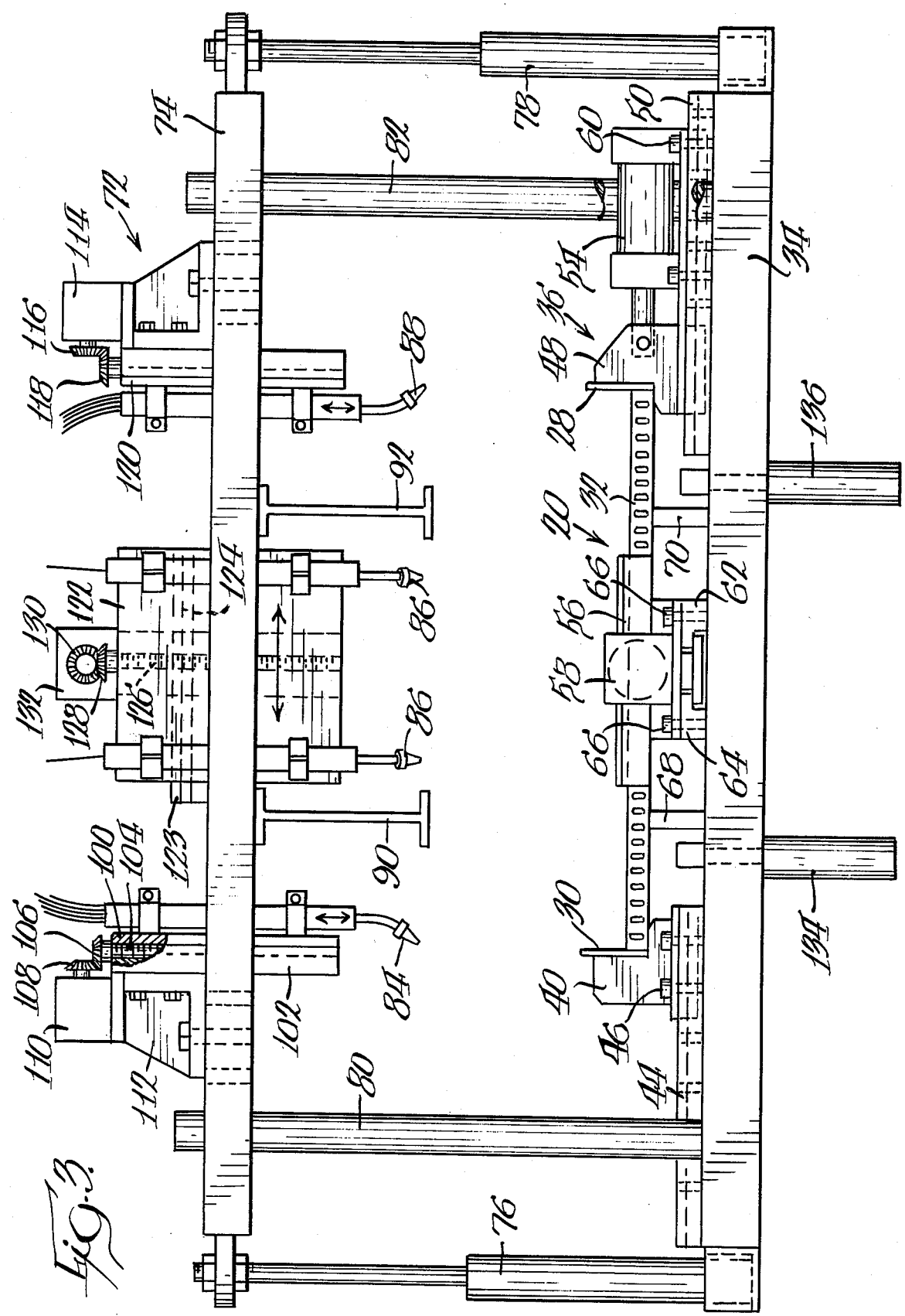

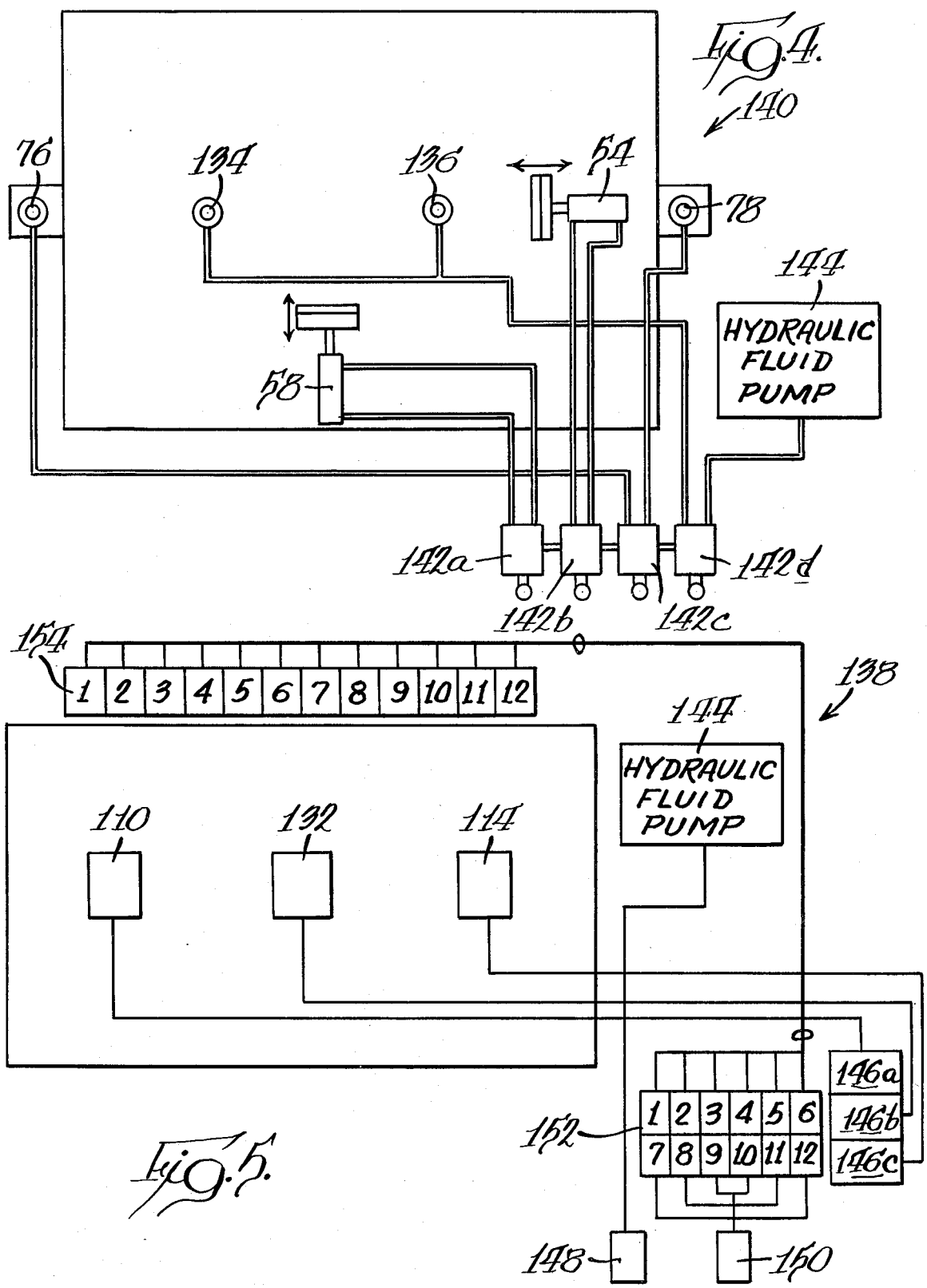

APPARATUS FOR WELDING METAL GRATING STRUCTURES

BACKGROUND OF THE INVENTION

The present invention relates to welding apparatus, and in particular to an apparatus for welding metal grating structures.

Metal gratings of the type comprised of intersecting elements defining interstices therebetween find use in landings, walkways, platforms, trench covers and stair treads. Depending upon the particular use for which the grating is intended, the same is often provided with additional structural components. For example, if the grating is to be used to cover a trench, banding bars may be welded along side edges of the grating to facilitate handling and to form closed edges thereof for smoothly abutting a frame in which the grating is placed. In the case where the grating is used in a stair tread, a nosing having a roughened surface is usually affixed to a leading edge of the grating to provide a non-slip safety surface, and if the stair tread is to be mounted along or between adjacent walls or other supports, end plates may be affixed to side edges of the grating to facilitate its mounting.

The various components which may be affixed to the grating are of metal, and are most expeditiously attached to the grating by welding. Conventionally, this comprises placing the grating and components on a fixture for holding the same in aligned relationship, and then welding the parts together, all by manual operation. Such a method of assembly is quite slow and therefore expensive, particularly in the manufacture of stair treads in which four parts, a grating, nosing and two side plates are joined.

OBJECT OF THE INVENTION

The primary object of the present invention is to provide an apparatus for automatically holding in aligned relationship and welding together a metal grating and components therefor.

SUMMARY OF THE INVENTION

In accordance with the present invention, an apparatus for welding a metal grating structure of a type comprising a metal grating formed of intersecting members defining interstices therebetween and at least one metal element along a side edge of the grating, comprises a fixture for receiving and supporting the grating and element in abutting and aligned relationship, a welding gun assembly having at least one welding gun normally spaced remote from the fixture, and means for moving the welding gun assembly to move the gun to adjacent a juncture between the grating and element to effect a weld therebetween.

Preferably, the apparatus is for welding a metal stair tread structure of a type comprising a rectangular grating formed of a plurality of parallel bars intersecting perpendicularly with a plurality of parallel elements and defining the interstices therebetween, a pair of end plates along opposite ends of the bars, and a generally L-shaped nosing extending along an end bar and between the side plates. In this case, the fixture has clamps for receiving the grating, end plates and nosing, as well as first motor means for moving the clamps for releasably gripping the grating, end plates and nosing in aligned relationship. The welding gun assembly has a plurality of welding guns normally spaced remote from the fixture, and second motor means are provided for moving the welding assembly to move the guns to adjacent junctures between the end plates and the grating bars and between the nosing and the end bar, and for then moving the guns along the junctures to effect elongate welds therealong.

The welding assembly second motor means includes hydraulic motor means for moving the guns to adjacent the junctures, and electric motor means for then moving the guns along the junctures, with at least two of the guns effecting welds between opposite ends of the nosing and the end plates thereat. The electric motor means includes three separate motors, a first for moving at least a first two of the guns along the junctures between one end plate and one end of the grating bars and nosing, a second for moving at least another two guns parallel to the first two guns and along the junctures between the other end plate and the opposite ends of the grating bars and nosing, and a third for moving at least one other of the guns along the juncture between the nosing and end bar of the grating. In the event that the assembly binds in the fixture after welding, hydraulically actuated means are provided to move the assembly therefrom.

Other objects, advantages and features of the invention will become apparent from a consideration of the following detailed description, when taken in conjunction with the accompanying drawings.

BRIEF DESCRIPTION OF THE DRAWINGS

FIG. 1 is a perspective view of a metal grating structure or stair tread, showing one type of product which may advantageously be manufactured with the welding apparatus of the present invention;

FIG. 2 is a fragmentary, perspective view of the welding apparatus, illustrating the arrangement of a fixture for holding various components of a grating structure in aligned relationship in order that the same may be joined by welding;

FIG. 3 is a view taken substantially along the line 3—3 of FIG. 2, and shows the arrangement of a plurality of welding guns for effecting welds between the various components of the grating structure;

FIG. 4 is a diagrammatic representation of a hydraulic circuit for operating the fixture and for moving the welding guns into engagement with the grating structure, and FIG. 5 is a diagrammatic representation of an electric circuit for controlling electric motors for operating the welding guns and welding wire feed mechanisms therefor.

DETAILED DESCRIPTION

Referring to the drawings, there is shown in FIG. 1 and indicated generally at 20 a metal grating structure of a type which may advantageously be manufactured with the apparatus of the invention. The structure includes a grating 22 having a plurality of spaced, parallel, bar-shaped members 24 connected perpendicularly with a plurality of spaced, parallel, rod-shaped elements 26 and forming interstices therebetween. For the embodiment of the grating shown the rod-shaped elements 26 are welded to upper portions of the members 24, but it is understood that any other form of grating could be used in the practice of the invention, for example a grating having all bar-shaped members or all rod-shaped members which intersect at any desired angle.

In use of the grating 22, the same is often further manufactured by being provided with edge components, for example banding bars on opposite edges in the fabrication of trench grating. For the structure shown, the grating has been manufactured into a stair tread by means of a pair of metal side or end plates 28 and 30 fastened to opposite side edges of the grating and a metal L-shaped nosing 32 connected to a third edge and between the end plates. The end plates facilitate mounting of the stair tread between side supports, and the nosing is positioned at the forward or leading end of the stair tread and is usually provided with a roughened or apertured non-slip safety surface.

In a conventional method of manufacture of the stair tread or grating structure 20, the grating 22, end plates 28 and 30 and nosing 32 are placed in a manually adjustable fixture which holds the components in aligned relationship. By manual operation the end plates are then welded to opposite ends of the nosing and grating bars 24, and the nosing is further welded to the adjacent end bar 24. In consequence of the manual operations involved in adjusting the fixture and effecting the welds, which welds may be twelve or more in number, assembly of the components into a stair tread is very time consuming and expensive.

In accordance with the present invention, which greatly facilitates and introduces significant economies into the manufacture of a grating structure, such as the stair tread 20, means are provided for receiving the individual components of the structure, namely, the grating 22, the end plates 28 and 30 and the nosing 32, and for automatically holding the same in aligned relationship while making a plurality of welds therebetween. By virtue of the automatic operation of the apparatus, the time required to manufacture a stair tread is reduced to less than twenty percent of that required by manual process, whereby the cost of the stair tread is significantly reduced.

Referring to FIGS. 2 and 3, the apparatus of the invention for automatically welding grating structures of the type shown in FIG. 1 includes a base 34 on which is mounted a fixture assembly indicated generally at 36. The fixture is for automatically holding the various components of the grating structure in aligned relationship in order that they may be automatically joined by welding, and includes a rearward backing plate, guide or bar 38 secured to the base, a side hold down block, clamp or mount 40 supported on a pair of rails 42 and 44 in dovetail fashion and adjustably positionable thereon by bolts 46 extendable through aligned holes in the block and rails, and an opposed side hold down block, clamp or mount 48 similarly supported on a pair of rails 50 and 52 in dovetail fashion and connected with the plunger of a cylinder 54 for movement along the rails. Also included is a forward hold down block, clamp or mount 56 opposite from the guide 38 and mounted on the plunger of a cylinder 58 for movement therewith. The cylinder 54 is adjustably mounted on the rails 50 and 52 by means of bolts 60, and the cylinder 58 is adjustably mounted on a pair of rails 62 and 64 by means of bolts 66, whereby in combination with the adjustable mounting of the block 40 the fixture may readily accommodate different sizes of grating structures.

Each of the hold down blocks 40, 48, and 56 has an inwardly facing L-shaped working face for engaging portions of the grating structure 20. In use of the fixture 36 to hold the components of the grating structure in aligned relationship, the cylinders 54 and 58 are first operated to move apart both the hold down blocks 40 and 48 and the hold down block 56 and backing plate 38. The grating structure is then placed on the fixture in an inverted condition. To this end, the grating 22 is placed on the lower surfaces of the working faces of the hold down blocks, with a pair of supports 68 and 70 extending from the base 34 for holding the grating in alignment with the blocks. The end plate 30 is then placed against a back surface of the working face of the block 40 and the grating moved thereagainst to hold the plate in position, whereafter the end plate 28 is placed against a back surface of the working face of the block 48, the back surface being magnetic to hold the plate in position. The nosing 32 is then nestled in the working face of the front block 56 adjacent an end bar 24 of the grating and between the end plates, such that a forward side of the L-shaped nosing extends generally parallel to the end bar and the other side of the nosing perpendicular thereto. To facilitate positioning of the components in the fixture and to aid in orienting the same therein, the base 34 is tilted at an angle of about 45° with the cylinder 58 uppermost, whereby an operator may reach across the upper end of the base and place the components in position on the fixture. In this manner, the backing plate 38 provides a guide for the end plates and the grating to gravitate against, whereby upon actuation of the cylinders 54 and 58 to extend their plungers the end plates, nosing and grating are automatically moved together and held in aligned orientation for being welded.

The means for welding the held and oriented components of the grating structure includes a welding assembly, indicated generally at 72, supported above the fixture 36 and automatically movable toward and away from the fixture. The welding assembly includes a support plate 74 carried on the plungers of a pair of cylinders 76 and 78 for movement toward and away from the fixture and guided during movement of two pairs of shafts 80 and 82 fastened to the base 34 and slidably received in passages through the plate 74. To accomplish the welding function a plurality of welding guns 84, which total five in the disclosed embodiment, are provided for welding the end plate 30 to the grating 22 and the nosing 32, two welding guns 86 weld the nosing to the grating, and five guns 88 weld the end plate 28 to the grating and nosing.

More particularly, upon retraction of the plungers of the cylinders 76 and 78 the welding assembly 72 is moved toward the fixture 36 until a pair of clamps 90 and 92 engage the grating to both aid in holding the grating in position on the fixture during welding and to limit downward movement of the welding assembly. At this time, one of the welding guns 84 is positioned generally adjacent the juncture between the end plate 30 and the nosing at a lower (as inverted) portion of the forward side of the nosing, and the remaining four guns 84 are each positioned adjacent junctures between the end plate 30 and ends of selected grating bars 24 at lower (again as inverted) portions of the ends. The welding guns 88 are similarly positioned with respect to the end plate 28 and the ends of the nosing and grating bars thereat, and the two center guns 86 are adjacent the juncture between the nosing and the immediately adjacent bar 24 of the grating. The welding guns 84 and 88 are then moved upward and perpendicularly away from the base 34 along the junctures of the end plates, grating and nosing to form welds therebetween, for example the five welds 96 formed by the guns 88 at the end plate 28 as shown in FIG. 2, and the two welding plates 86 are moved parallel to the base 34 to form two elongate welds 98 between the nosing and the adjacent grating bar 24.

Means for moving the welding guns 84 in directions perpendicular to the base 34 includes a plate 100, for supporting the guns 84, received in dovetail fashion within a housing 102 for movement therein. The guns, plate and housing extend through a passage in the support plate 74, and an inner surface of the plate 100 is provided with a rack formation in meshed engagement with a worm 104 extended through the housing and having an upper bevel gear 106. The gear 106 is meshed with a bevel gear 108 of a motor 110 supported on the plate 74 by a bracket 112, whereby operation of the motor rotates the worm through the gears and to move the welding guns in directions perpendicular to the base 34. The welding guns 88 are similarly moved perpendicularly to the base 34 through a structure including an electric motor 114 which rotates a worm through a pair of gears 116 and 118 to move a plate 120, on which the guns 88 are attached, through a rack formed on the plate.

To move the welding guns 86 in directions parallel to the base 34, the guns are attached to a plate 122 received dovetail fashion in a housing 123 for movement in directions parallel to the base. A rearward side of the plate has a rack formation 124 engaged with a worm 126 extending through the housing and having a relatively steep pitch in order to effect a transfer of right angle motion from the worm to the rack. The upper end of the worm is provided with a bevel gear 128 meshed with a gear 130 on the output shaft of an electric motor 132, whereby operation of the motor rotates the worm and moves the welding guns 86. Means are shown in the form of individual lines connected with the upper ends of the welding guns for carrying electric current, a feed of welding wire and a supply of welding gas to heads of the guns, all in a manner well known in the art for MIG arc welding.

The guns 84 and 88 are normally maintained in lower positions with respect to the plate 74. Upon lowering of the plate by the cylinders 76 and 78 to engage the clamps 90 and 92 with the grating 22 the welding guns are positioned, as described, adjacent lower portions (as inverted) of the abutting grating structure components, namely, the grating, end plates and nosing. Electric current, wire feed and welding gas is then supplied to the guns and the motors 110, 114 and 132 are energized to raise and move the guns 84 and 88 along the selected junctures between the end plates and the grating bars and nosing, and to move the guns 86 along the juncture between the nosing and the adjacent end bar of the grating. This causes formation of elongate welds, which may be on the order of one inch long, in order to join the individual components together into the unitary grating structure 20. After the welds are formed, the cylinders 76 and 78 are again actuated to elevate the welding assembly 72 above the fixture 36, and the motors 110, 114 and 132 are reversed to return the guns to their lower positions in preparation for the next welding operation. At this time also, the cylinders 54 and 58 are operated to retract their plungers to release the grating structure from the hold down blocks, and the grating structure is then removed from the fixture. Since it occasionally happens that as a result of the heat and pressures encountered during the welding operation the grating structure binds within the fixture after retraction of the hold down blocks, a pair of hydraulic cylinders 134 and 136 fastened beneath the base 34 have plungers extending upward through the base for moving the grating structure from the fixture. Thus, a grating structure that is stuck in the fixture may be released simply by actuating the cylinders 134 and 136.

As previously discussed, a convenient location for an operator of the apparatus is on the side of the inclined base 34 opposite from the fixture assembly 36. In this manner, the operator is safely away from the moving elements of the apparatus, and in a position to conveniently insert the grating structure components into the fixture. The operator station would be to the right of the apparatus as shown in FIG. 2, and to this end a control panel comprising an electric control unit 138 and a hydraulic control unit 140 are located adjacent the operator station for efficiency in operating the electric motors 110, 144 and 130, as well as the hydraulic cylinders 48, 58, 76, 78, 134 and 136.

The hydraulic control unit 140 is shown diagrammatically in FIG. 4, and includes a plurality of switches 142a–d for receiving hydraulic fluid from a pump 144 and for selectively connecting the fluid with the cylinders. The switches 142a and 142b control operation of the fixture cylinders 58 and 54, respectively, for clamping the grating structure in aligned position for welding, the switch 142c controls the side cylinders 76 and 78 for vertically moving the welding assembly 72, and the switch 142d controls the two grating structure ejecting cylinders 134 and 136, whereby selective actuation of the switches controls performance of the various hydraulic functions of the welding apparatus.

The electric control unit 138 is shown diagrammatically in FIG. 5, and includes three switches 146a–c for operating and for controlling the speed and direction of operation of the three electric motors 110, 132 and 114, respectively. Also included is a switch 148 for controlling operation of the hydraulic fluid pump 144, and a switch 150 for applying power to twelve wire feed control switches 152 for the welding guns 84, 86 and 88. Each of the wire feed switches 152 is connected with an associated one of twelve welding wire feed motors 154, one for each gun, for operating and controlling the speed of operation of the wire feed motor, thereby to control wire feed and the rate of wire feed to each welding gun. In this manner, depending upon the size of the grating structure to be manufactured and the number of welds to be formed thereon, the switches 152 provide selective control of the welding guns.

The switches 146a–c allow selective control over the speed of operation of the electric motors 110, 114 and 132, and the switches 152 allow selective control over the speed of operation of the wire feed motors 154. Thus, the wire feed rate may be coordinated with the speed of movement of the welding guns along the junctures of the grating structure components to control the particular characteristics of the welds formed. In consequence, relatively light welds may be formed on grating structures with relatively light components, and heavier or more massive welds may be formed on structures having relatively heavy components.

Although twelve welding guns have been illustrated for the manufacture of the particular stair tread or grating structure 20 shown, it is understood that the invention contemplates using fewer or more welding guns in accordance with the size and nature of the grating structure. Thus a smaller grating structure, for example one having fewer front to rear bar-shaped members 24, would require a lesser number of guns, but in practice of the invention such a structure would be most readily accommodated simply by turning off certain ones of the guns 84 and 88 by means of the switches 152. Also, although the invention has been described with respect to the manufacture of a stair tread having a grating, end plates and nosing, depending upon the particular end use of the stair tread the same could just as readily be manufactured without one or more of the end plates or nosing. In addition, the apparatus is not limited to the manufacture of stair treads, but may advantageously also be used in the manufacture of trench gratings or any other type of grating structure in which one or more components are welded to a grating.

Although embodiments of the invention have been described in detail, various modifications and other embodiments thereof may be devised by one skilled in the art without departing from the spirit and the scope of the invention, as defined by the appended claims.

What is claimed is:

1. An apparatus for welding a metal stair tread structure of a type including a generally rectangular grating formed of intersecting elements defining interstices therebetween, a pair of plates along opposite first and second side edges of the grating and a nosing element extending along a third edge of the grating and between the side plates, comprising a fixture for receiving and holding the grating, side plates and nosing in aligned relationship; a welding gun assembly having a plurality of MIG arc welding guns normally spaced from said fixture, said welding guns being arranged in three rows defining three sides of a rectangle and corresponding to the three side edges of the grating; and means for moving said welding gun assembly to position said welding guns adjacent selected junctures between the grating, side plates and nosing in order to form welds therebetween, said means for moving said welding gun assembly positioning at least some of said guns adjacent junctures within the interstices formed by the intersecting grating elements, and including means for moving said welding guns along their associated junctures to form elongate welds therealong, said means for moving said welding guns moving said rows separately from each other and moving at least two adjacent rows of said rectangle in a direction orthogonal to one another during the welding operation.

2. An apparatus as in claim 1, said fixture including a first pair of holding members for receiving the grating and end plates therebetween, a second pair of holding members for receiving the grating and nosing therebetween, and means for moving the holding members of each pair toward and away from each other in directions orthogonal the directions of movement of the holding members of the other pair and in a plane parallel to that of the grating, said pairs of holding members being movable sufficiently far apart to receive the grating, end plates and nosing therebetween, said pairs of holding members when moved together moving the grating, end plates and nosing into aligned relationship.

3. An apparatus as in claim 2, said means for moving each pair of holding members including motor means for moving one of said holding members of each pair toward and away from the other holding member of that pair, said other holding member of each pair being secured against movement.

4. An apparatus as in claim 3, including at least one hydraulic cylinder having a plunger movable in directions orthogonal to the relative direction of movement of each said pair of holding members and actuable to eject the stair tread from the fixture after the grating, side plates and nosing are welded together.

5. An apparatus as in claim 2, one of said holding members of said first pair having a magnetic surface for holding one of the end plates thereto.

6. An apparatus as in claim 3, said motor means for moving one holding member of each pair including a pair of hydraulic cylinders, each having a plunger connected with one holding member of each pair for moving the same toward and away from the other holding member of that pair.

7. An apparatus as in claim 2, said means for moving said welding gun assembly including hydraulic motor means for moving said assembly toward said fixture to position said guns adjacent junctures between the grating, end plates and nosing, said means for moving said welding guns along their associated junctures to form elongate welds including electric motor means.

8. An apparatus as in claim 7, including a plurality of clamping members connected with said welding assembly and movable against the grating for holding the grating against said fixture when the welds are being formed.

9. An apparatus for welding a metal stair tread structure of a type including a rectangular grating formed of a plurality of parallel bars intersecting perpendicularly with a plurality of parallel elements and defining interstices therebetween, a pair of plates along opposite side ends of the bars, and a generally L-shaped nosing extending along an end bar and between the side plates, comprising a fixture having clamps for receiving and releasably holding the grating, end plates and nosing in adjacent and aligned relationship and first motor means for moving the clamps to grip and release the grating, end plates and nosing; a welding assembly having a plurality of MIG arc welding guns arranged in three rows which lie along three sides of a rectangle and which are alignable with the junctures between the grating, end plates and nosing, said welding guns normally being spaced from said fixture; and second motor means for moving said welding assembly toward said fixture to move said welding guns into alignment with and adjacent to junctures both between the end plates and the ends of the grating bars and nosing and between the nosing and the end bar of the grating, and for then moving said welding guns along the junctures to form elongate welds between the grating, end plates and nosing, said second motor means including at least one hydraulic cylinder for moving said welding assembly to position said welding guns in alignment with and adjacent to the junctures, and electric motor means for then moving said guns along the junctures to form the elongate welds, said electric motor means including a first electric motor for moving at least two of said guns along the junctures between one end plate, one end of the grating bars and one end of the nosing, a second electric motor for moving at least another two of said guns along the junctures between the other end plate and the opposite end of the grating bars and nosing, and a third electric motor for moving at least one other of said guns along the juncture between the nosing and end bar of the grating, said welding guns moved by said first and second electric motors moving in directions parallel to each other and orthogonal to the direction of movement of said at least one welding gun moved by said third electric motor.

10. An apparatus for welding a grating structure of a type including a metal grating and at least one metal element on a side edge of the grating, comprising a fixture; holding members for receiving and releasably holding the grating and element in adjacent and aligned relationship; first motor means for moving said holding members toward and away from each other, said holding members being movable sufficiently far apart to receive the grating and element therebetween, said holding members when moved together moving the grating and element into adjacent aligned relationship; a welding gun assembly having a plurality of MIG arc welding guns normally spaced from said fixture; second motor means for moving said welding gun assembly to move said welding guns from positions remote from to positions adjacent at least one juncture between the grating and element in order to form a weld therebetween; third motor means for moving said welding guns along the at least one juncture to effect elongate welds between the grating and element; and clamping means separate from said welding guns and connected to said welding assembly for movement therewith into engagement with the grating when the weld is being formed to hold the grating against said fixture, said second motor means including hydraulic cylinder means, said third motor means including electric motor means, wherein the grating and element are such that the at least one juncture is a plurality of separate junctures, said welding guns being positioned so that each effects a discrete weld between the grating and element along a separate one of the junctures, wherein the grating structure is of the type including a grating, at least one plate on one side edge of the grating and a nosing extending along an adjacent side edge of the grating generally perpendicular to the one side edge, said welding guns being arranged in first and second perpendicular rows with at least two welding guns in each row, said third motor means moving said welding guns in said first row in directions perpendicular to movement of said welding guns in said second row, said holding members including first and second pairs of holding members, the holding members of each pair being movable by said first motor means toward and away from each other in directions perpendicular both to the relative directions of movement of the holding members of the other pair and to the direction of movement of said welding gun assembly by said second motor means.

11. An apparatus for welding a metal stair tread structure of a type including a rectangular grating and first and second elements on side edges of the grating, comprising a fixture for supporting the grating and elements; a plurality of clamps on the fixture for holding the grating and elements; first motor means for operating the clamps to either hold the grating and elements in aligned relationship or to release the same; a MIG arc welding gun assembly having a plurality of welding guns arranged in two rows alignable with the junctures between the sides of the grating and the elements, said welding gun assembly also having means for supplying electric power, a feed of welding wire and a supply of welding gas to said welding guns; second motor means for moving said welding gun assembly toward and away from said fixture to position said welding guns in alignment with and adjacent to junctures between the sides of the grating and the elements; and third motor means, operative upon said second motor means moving said welding guns to adjacent the junctures between the grating and elements, for moving said welding guns along the junctures to form elongate welds therealong, wherein the stair tread structure is of a type including a third element along a third side edge of the grating, said MIG arc welding gun assembly including a third row of welding guns, said three rows of welding guns lying along three sides of a rectangle and being alignable with the junctures between the three sides of the grating and the three elements, said second motor means moving said three rows of welding guns to adjacent the junctures between the three sides of the grating and the elements and said third motor means moving said three rows of welding guns along the junctures, wherein said third motor means comprises first and second motors for moving said first and second rows of welding guns, respectively, in parallel directions and along their associated junctures between the grating and elements, and a third motor for moving said third row of welding guns along its associated junctures in directions orthogonal to movement of said first and second rows of welding guns.

12. An apparatus for welding a metal structure of a type including a generally rectangular first member having projecting elements along first and second opposite side edges thereof which define interstices therebetween, second and third members along the first and second side edges and against ends of the elements and a fourth member extending along a third edge of the first member and between the second and third members, comprising a fixture for receiving and holding the first, second, third and fourth members in aligned relationship; a welding gun assembly having a plurality of welding guns normally spaced from said fixture, said welding guns being arranged in three rows defining three sides of a rectangle and corresponding to the three side edges of the first member; and means for moving said welding gun assembly to position said welding guns adjacent selected junctures between the members in order to form welds therebetween, said means for moving positioning at least some of the guns adjacent junctures within the interstices and including means for moving said welding guns along their associated junctures to form elongate welds therealong, said means for moving said welding guns moving said rows separately from each other and moving at least two adjacent rows of said rectangle in a direction orthogonal to one another during the welding operation.

13. An apparatus for welding a metal structure of a type including a generally rectangular first member having projecting elements along first and second opposite side edges thereof which define interstices therebetween, second and third members along the first and second side edges and against ends of the elements, and a fourth member extending along a third edge of the first member and between the second and third members, comprising a fixture having clamps for receiving and releasably holding the first, second, third and fourth members in adjacent and aligned relationship and first motor means for moving the clamps to grip and release the members; a welding assembly having a plurality of welding guns arranged in three rows which lie along three sides of a rectangle and which are alignable with the junctures between the members, said welding guns normally being spaced from said fixture; and second motor means for moving said welding assembly toward said fixture to move said welding guns into alignment with and adjacent to junctures both between the second and third members and the ends of the elements and the fourth member and between the fourth member and the third side of the first member, and for then moving said welding guns along the junctures to form elongate welds between the members, said second motor means including at least one hydraulic cylinder for moving said welding assembly to position said welding guns in alignment with and adjacent to the junctures, and electric motor means for then moving said guns along the junctures to form the elongate welds, said electric motor means including a first electric motor for moving at least two of said guns along the junctures between the second member, an end of the elements and one end of the fourth member, a second electric motor for moving at least another two of said guns along the junctures between the third member and an opposite end of the elements and fourth member, and a third electric motor for moving at least one other of said guns along the juncture between the first and fourth members, said welding guns moved by said first and second electric motors moving in directions parallel to each other and orthogonal to the direction of movement of said at least one welding gun moved by said third electric motor.

14. An apparatus for welding a metal structure of a type including a first member having first and second side edges and elements projecting from the first side edge and defining interstices therebetween, a second member along the first side edge and ends of the elements and a third member along the second side edge, comprising a fixture for receiving and holding the first, second and third members in aligned relationship; a welding gun assembly having a plurality of welding guns normally spaced from said fixture, said welding guns being arranged in two rows corresponding to the two side edges of the first member; and means for moving said welding gun assembly to position said welding guns adjacent selected junctures between the first, second and third members in order to form welds therebetween, said means for moving said welding gun assembly positioning at least one of said guns adjacent a juncture between the second member and ends of the elements of the first member and within the interstices and including means for moving said welding guns along their associated junctures to form elongate welds therealong, said means for moving said welding guns moving said rows separately from each other and moving said two rows in a direction orthogonal to one another during the welding operation.

* * * * *